United States Patent [19]

Williamsen

[11] 4,194,787

[45] Mar. 25, 1980

[54] DUMP BODY WITH INSIDE GATE

[75] Inventor: Leland C. Williamsen, Salt Lake City, Utah

[73] Assignee: Williamsen Truck Equipment Corporation, Salt Lake City, Utah

[21] Appl. No.: 869,142

[22] Filed: Jan. 13, 1978

[51] Int. Cl.² .................................... B60P 1/16
[52] U.S. Cl. ......................... 298/23 M; 105/261 A; 298/17 R; 298/22 R
[58] Field of Search ............ 298/7, 8 R, 17 R, 19 R, 298/22 R, 23 R, 23 M, 22 J, 22 P, 22 D, 1 R; 105/261 R, 261 A, 270, 271

[56] References Cited

U.S. PATENT DOCUMENTS

| | | | |
|---|---|---|---|
| 676,478 | 6/1901 | Starkey | 105/261 A X |
| 1,621,075 | 3/1927 | Larkin | 298/23 R |
| 1,952,986 | 3/1934 | Horton | 298/8 R |
| 3,111,346 | 11/1963 | Harbers | 298/23 M X |
| 3,424,498 | 1/1969 | Maxon | 298/7 |
| 3,552,659 | 1/1971 | Meyer | 298/8 X |
| 4,030,751 | 6/1977 | Bobka | 298/17 R X |

Primary Examiner—Stephen G. Kunin
Assistant Examiner—George F. Abraham
Attorney, Agent, or Firm—Robert R. Finch

[57] ABSTRACT

A dump body for handling bulk material in which the tail gate is located inside the body walls sufficiently forward of the rear end to provide a delivery chute. The body is adapted to be mounted with the tail gate essentially over the rear wheels and the discharge chute extending back therefrom. Body configuration may be elliptical or rectangular and the sidewalls continuously diverge from bottom to top. The gate is hinged by overhead relatively close-tolerance bearings and trunnions by which the gate is hung and a space is provided between the gate edge and body wall even when fully closed, the space being filled with a flexible seal mounted on the gate perimeter. Specially shaped stops are located on the inner sidewall against which the gate butts on closing. A remotely actuated latch mounted on the body extends through the body wall extension to engage and lock the gate.

1 Claim, 13 Drawing Figures

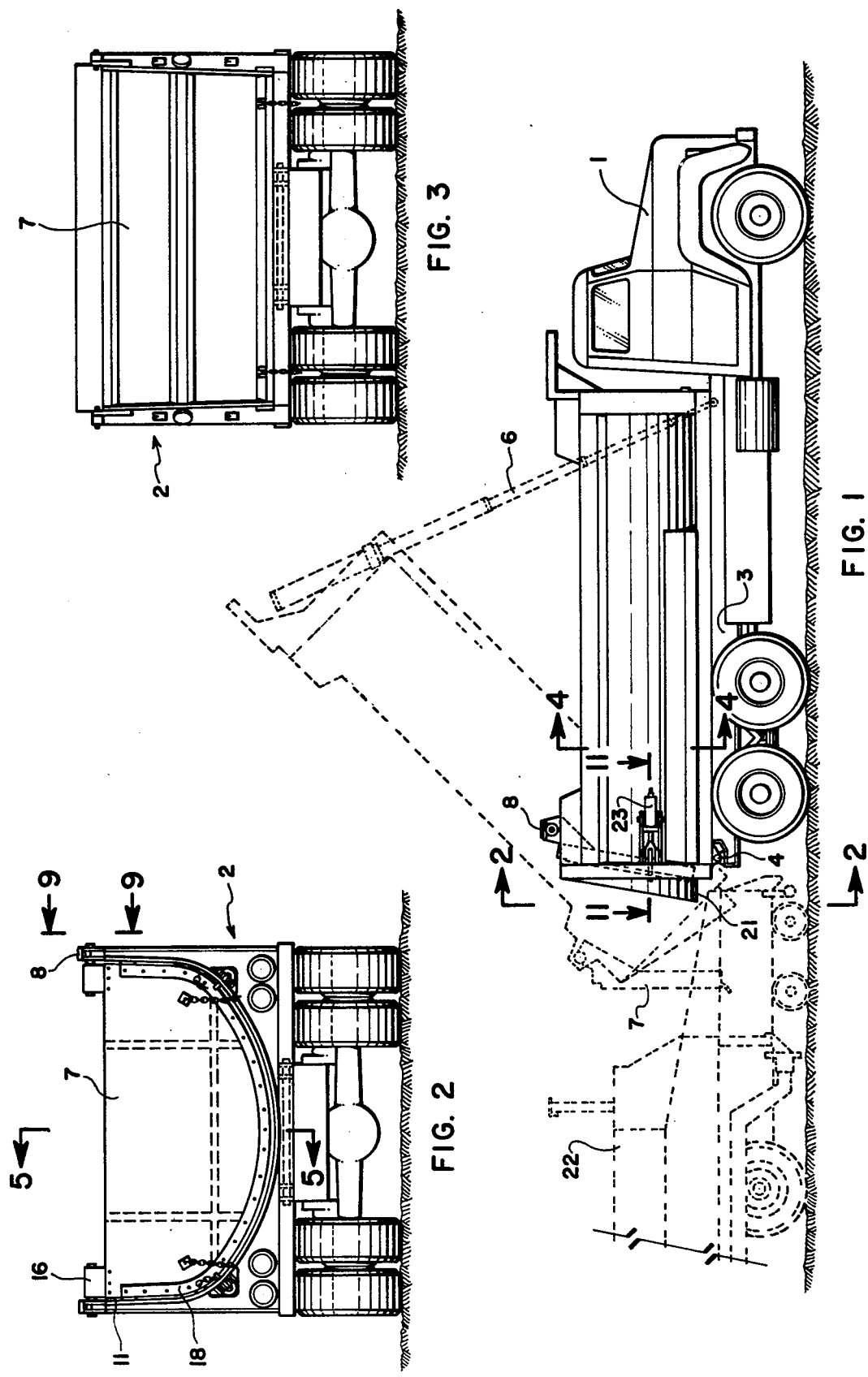

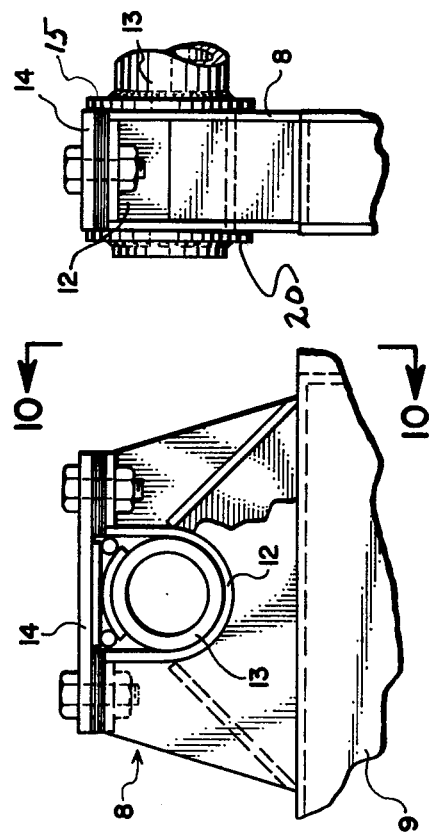
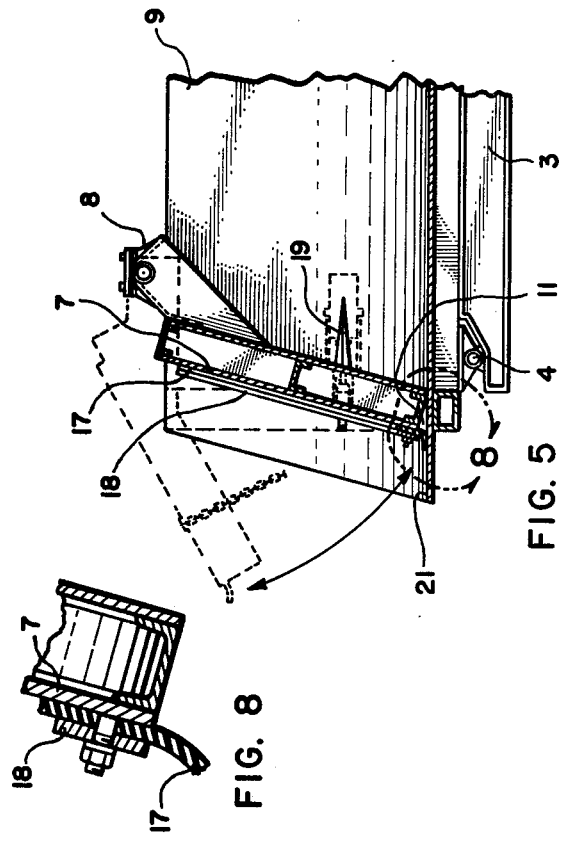
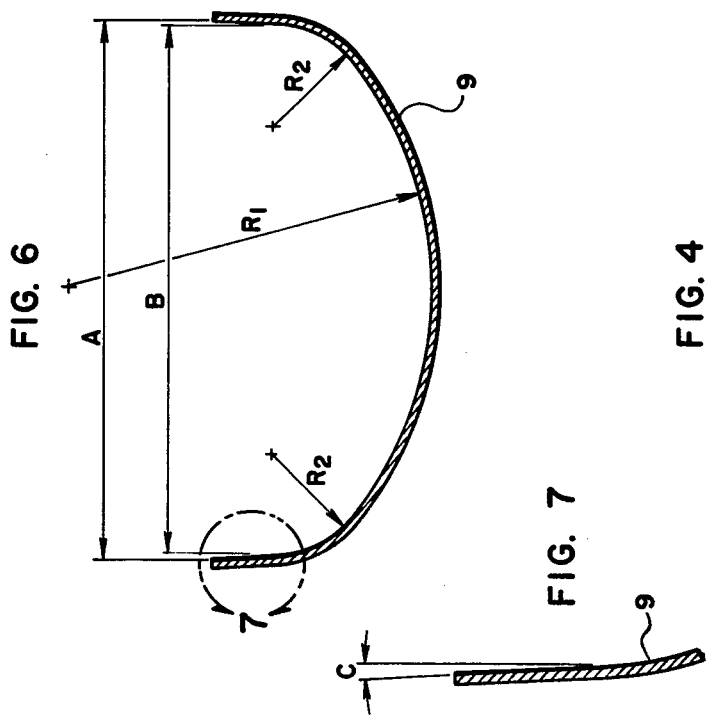
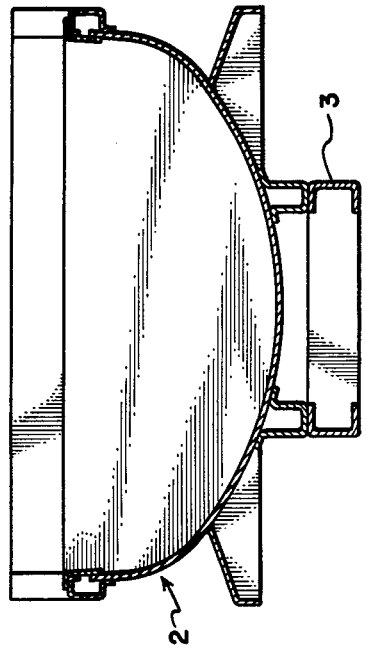

DUMP BODY WITH INSIDE GATE

FIELD AND BACKGROUND OF THE INVENTION

This invention relates to dump bodies for use either on a straight truck or as a trailer and of a construction especially adapted to haul bulk material, such as asphalt, for direct delivery to further use such as to a low walled hopper on a road paving machine.

The usual dump body is closed by a top-hinged gate that butts against the rear edge of the body bottom and sidewalls. A long standing problem in the discharge of bulk material from the usual dump body is the inability to direct the load cleanly into a low walled receiving vessel. To solve this problem, some bodies are built with a relatively long overhang aft of the rear axle so that, upon dumping, the body may reach over a low wall. While this construction is effective as a delivery chute into a low walled vessel, it places a disproportionate part of the body weight and load weight back of the rear axle thus causing an unbalanced load. Another solution to the problem is to mount a "scow" at the rear of the body. A scow is simply a hinged extension connected to the rear of the body which is lowered as desired for use as a delivery chute.

A more recent proposal is a body extending beyond the rear axle and a gate located inside the body sidewalls forward of the rear edges. With this arrangement the body acts as a chute and the inside gate keeps the load in the desired distribution so it is balanced. However, the inside gate as previously proposed has not been too useful because on closing the inside gate is pinched between the body walls and jammed in the closed position. Also, in the previously proposed inside gate, a part of the latch and mechanism was located on the gate with the result that it was subject to damage by bumping and to fouling by the material being handled.

SUMMARY AND DESCRIPTION OF INVENTION

It is the primary object of this invention to provide a dump body construction overcoming the foregoing problems that is capable of carrying a balanced load of bulk material and delivering it to a precise location.

In accordance with the foregoing, it is another important object to provide a dump body having an inside mounted tail gate located forward of the rear edges of the body, the gate and body having specific complemental configurations whereby binding of the gate between the body walls is avoided and the gate readily swings free for dumping upon tilting of the body.

A related object is the provision of a latch and mechanism for dependably locking and releasing the gate as required, the latch and mechanism being located outside and sufficiently far above the body floor to avoid fouling or damage of the latch by hot asphalt or other payload.

The foregoing and possibly other objects are attained by a dump body construction having upwardly diverging sidewalls, a gate mounted inside said body with its outer edges parallel to and spaced from the bottom and sidewalls, the gate being mounted by means of a bearing or hinge adjacent the top of the body which is so constructed that it prevents lateral flexing motion of the body walls and also maintains spacing between the body and gate, a resilient wiper seal filling the gap between the body and gate, at least one stop on the inside of the body above the bottom to limit closing movement of the gate, and a latch and actuating means mounted on the outer wall of the body above the floor line with the latch extending through an opening in the rear part of the wall to selectively engage and disengage the gate to lock it in and release it from the closed position.

In one configuration, the body is of rectangular shape and in another the lower portion is elliptical terminating in straight sidewalls. As noted, in both cases the sidewalls diverge outwardly above the bottom so the body is widest at the top.

In order that the invention may be more readily understood and easily carried out, reference is made to the accompanying drawings and the description thereof which are offered by way of illustration only and not in limitation of the invention.

In the drawings:

FIG. 1 is a side elevation view of a truck with an elliptical body embodying the invention. For purposes of illustration, a paving machine hopper for receiving bulk material is shown in phantom lines as is the discharge position of the dump body.

FIG. 2 is a sectional view of the body illustrated in FIG. 1 taken in the plane of line 2—2 of FIG. 1 looking in the direction of arrows 2.

FIG. 3 is a rear elevation view of a rectangular body embodying the invention and adapted to be mounted on a truck such as that shown in FIG. 1

FIG. 4 is a sectional view taken in the plane of line 4—4 of FIG. 1 looking in the direction of arrows 4 thereof.

FIG. 5 is a sectional view of the rear portion of the body taken in the plane of line 5—5 of FIG. 2 looking in the direction of the arrows 5.

FIG. 6 is a view similar to FIG. 4 but simplified by removal of top rails and structural members other than the body shell.

FIG. 7 is an enlarged view of the portion of the body encompassed by the circle 7 of FIG. 6.

FIG. 8 is an enlarged sectional view of that portion of the tail gate encompassed by the circle 8 of FIG. 5.

FIG. 9 is a side view of the tail gate hinge taken as looking in the direction of arrows 9 of FIG. 2.

FIG. 10 is another view of the hinge illustrated in FIG. 9 but looking in the direction of arrows 10 of FIG. 9.

Figure 11:
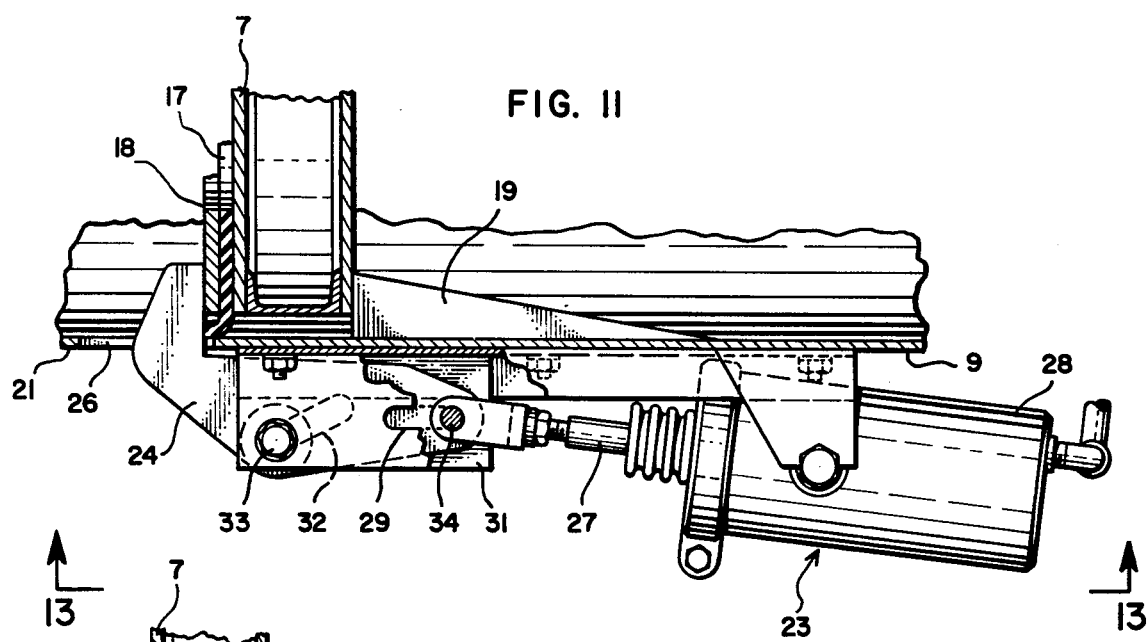
FIG. 11 is a sectional view of the gate latch taken along the line 11—11 of FIG. 1 and looking in the direction of arrows 11 of FIG. 1 with the gate latch locked.
Figure 12:
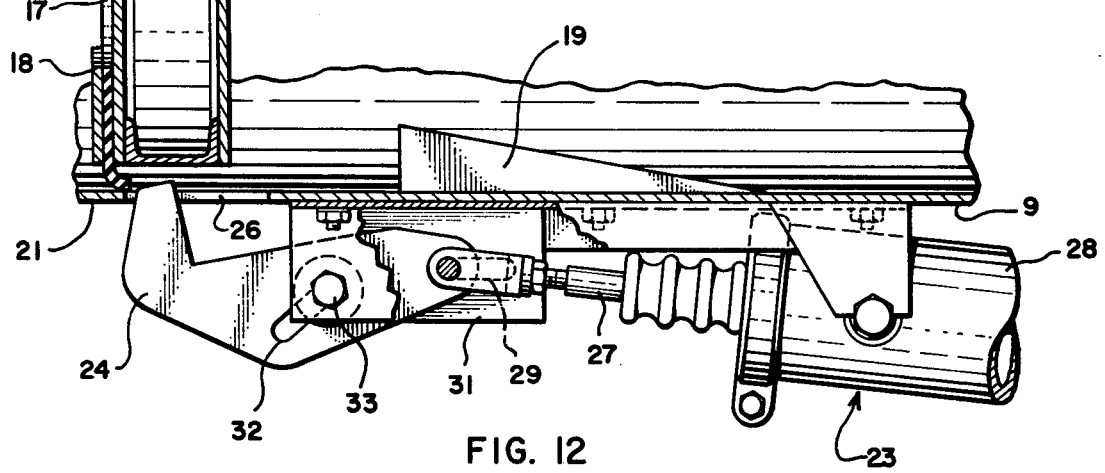
FIG. 12 is a view similar to FIG. 11 but with the latch in the unlocked position.
Figure 13:
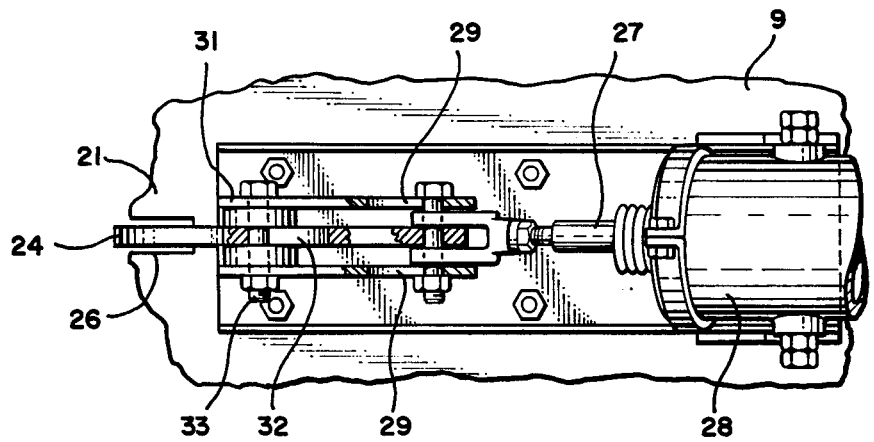
FIG. 13 is another view of the latch assembly but looking at the side thereof in the direction of arrows 13 of FIG. 11.

As best shown in FIGS. 1-3, the basic truck comprises the chassis and cab 1 and dump body 2. The chassis has longitudinal frame members 3 adjacent the rear of which the body 2 is hinged at a pivot 4 to effect tilting of the body between discharge and carry positions by action of a usual telescoping ram 6 operable between the chassis frame and the front end of the body.

In accordance with the present invention, the body configuration in combination with a tail gate 7 of particular construction, location, mounting, gate stop means, and a particular closure latch results in a unique dump body that enables carrying a balanced load, while providing a rear discharge chute and a freely swingable inside gate with reliable stop and latch means.

For convenience, the following description refers to the elliptical body as illustrated in FIGS. 1-2 and 4-12. Obviously, the same description applies to the rectangular form illustrated in FIG. 3.

The body is hinged at a pivot point 4 which is located close to the rear truck wheels. A gate 7 is mounted inside the body and is hinged by an overhead bearing located at the top of the body sidewall 9 and which is rugged yet of relatively close tolerance. The hinge or bearing comprises supports 8 and 16 mounted respectively on the top of the body 2 and the gate 7. The bearing 8 includes a partial cylindrical U shaped bearing 12 accepting a trunnion or stub shaft 13 over which is a bolted-on clamp 14. Replaceable linings, not shown, may be used in the bearing; and adjustment is effected by use of the shims under the clamp. The trunnions 13 are secured to and extend from relatively wide supports 16 on opposite sides of and at the top of the gate. An important requirement met by the hinge is that it maintains the required spaced relationship between the gate and body wall necessary to avoid binding between gate and wall and/or excessive expansion of the space therebetween which would cause spillage. In this connection, a space 11 of ¼ to ⅜ inch is desired. To prevent binding, a thick washer 15 is provided on the stub shaft 13 between the bearing members 8 and 16. The washer 15 may be welded to the stub shaft 13. A second bearing washer 20 is welded onto the outer end of the stub shaft 13 and the stub shaft is secured in the member 16 on the gate to prevent axial movement. Thus there is provided a fixed space on the shaft 13 between the washers 15 and 20 and it is this that is journalled in the bearing 8 on the body wall. The net result is to prevent flexing of the body walls and maintain the proper spacing between gate and body. To prevent leakage of small pieces of material being transported and to keep the body walls swept clean in the gate's path, a flexible seal or wiper strip 17 which may be of any suitable rubber or elastomer is mounted on the gate periphery by a bolted-on clamp 18. The strip is of a size to bend when the gate is fully closed and to reverse when the gate is opened (FIGS. 5, 8 and 11).

To limit inward travel of the gate so it does not jam against the body bottom or between the sidewalls, a stop 19 is secured to the body on each of the opposing inside walls above the bottom. The stops taper from a low front end inside the body to a maximum height of about 2 inches adjacent but inboard the rear edge of the body. With the stops so located the closed gate rests against the stops in a tilted position with proper spacing all around. Without the stops the gate would jam against the bottom. Tapering of the stops avoids material piling up thereon during discharge; and locating them above the bottom avoids the problem of material being caught between the stop and gate that could prevent full gate closure and locking. Stopping the gate in the tilted position permits additional bulk material to be carried low in the very rear of the body over the axle. Also, locating the hinge ahead of the stop insures that the gate closes in a tilted position so that gravity provides the closing force when the body moves from the tilted dump to the horizontal carry position.

Further insurance against the gate being jammed between the body walls is provided by forming the body so that its sidewalls diverge continuously from the bottom up. This is most clearly illustrated in FIGS. 6 and 7 for elliptical bodies wherein the dimensions A, B and C illustrate that the upper walls are further apart than the lower wall portions. The wall divergence or taper is also evident in the FIG. 3 view of the rectangular body. This taper, which is repeated in the gate itself, causes the space between gate and wall to increase quickly as the gate opens.

A chute for discharging material is provided by the rear portion 21 of the body which extends back from the closed gate to terminate well behind the body dump hinge pivot 4. With this arrangement, the chute 21 can be positioned over the low wall of a receiving hopper such as on the paving machine 22 indicated in FIG. 1 thus to direct the discharged material cleanly and accurately into the hopper.

Locking the gate closed is effected by a latch assembly 23 mounted on the outside body wall. A hook or clamp 24 is arranged to extend through an opening 26 of the body wall in the rear body extension 21. With the gate closed, the clamp 24 is pulled into the locked position (FIG. 11) against the gate by means of the piston rod 27 which is normally spring loaded to the closed position shown in FIG. 11. Compressed air acting on the pneumatic piston-cylinder 28 extends the piston rod 27 to unlock the clamp to free the hook. The path of the latch is determined by the slots 29 in the fixed bracket 31, the slot 32 in the clamp piece 24, which co-act with the fixed bolt 33 and with the pin 34 that moves with the rod 27 in the slot 29.

Although only rectangular and elliptical bodies have been described, the invention applies to any body having a configuration in which the opposite sidewalls diverge outwardly above the bottom such as, for instance, a hemi-cylindrical of V-shaped body. Also, the positioning of the gate will be made with respect to the axles to provide a balanced load.

While the invention has been described with respect to a hollow gate formed by two plates secured to intervening channel members, it is obvious that the invention applies to gates of any construction. Moreover, the inside mounted gate is useful in cases where the rear discharge chute is not provided.

I claim:

1. In a dump body of the type comprising an open top elongated body mounted on a frame with means for moving said body between a horizontal carry position and a tilted dump position, said body being defined by a bottom and upstanding sidewalls, said body having a front closed end and a rear open end, a gate adjacent said open end and hinge means for swinging said gate to open and close said open end, the improvement comprising said hinge means being located adjacent the top of said upstanding sidewalls and forward of said open end of said body, said gate being pivotally mounted to said hinge and shaped so that when in the closed position it is entirely contained between the sidewalls and bottom of said body with said open end of said body spaced rearwardly of said gate, the peripheral edge of said gate being substantially parallel to said bottom and sidewalls and said upstanding sidewalls diverge upwardly and outwardly relative to each other and there is provided lock means for selectively locking and releasing said gate, said lock means comprising openings in said opposite sidewalls at a location above the bottom and to the rear of said gate when the latter is in the closed position, a latch on the outside of each of said sidewalls adapted to move to and fro through said opening into and from the interior of said body respectively to hold and release said gate and means associated with each of said latches for selectively effecting movement thereof.

* * * * *